United States Patent [19]
Lo et al.

[11] 3,907,919

[45]*Sept. 23, 1975

[54] DEHYDROGENATION OF HYDROCARBONS

[75] Inventors: Ching-tsan Lo; Joe Jed Miller; Norbert Francis Cywinski, all of Odessa, Tex.

[73] Assignee: El Paso Products Company, Odessa, Tex.

[ * ] Notice: The portion of the term of this patent subsequent to Oct. 15, 1991, has been disclaimed.

[22] Filed: Apr. 9, 1973

[21] Appl. No.: 349,328

[52] U.S. Cl............. 260/680 R; 252/470; 252/472; 260/669 R
[51] Int. Cl.² ............................................. C07C 5/38
[58] Field of Search ...................... 260/680 E, 680 R

[56] References Cited
UNITED STATES PATENTS

| | | | |
|---|---|---|---|
| 2,394,625 | 2/1946 | Matuszak | 260/680 R |
| 3,110,746 | 11/1963 | Voge et al. | 260/680 E |
| 3,161,670 | 12/1964 | Adams et al. | 260/680 E |
| 3,414,631 | 12/1968 | Grasselli et al. | 260/680 E |
| 3,801,670 | 4/1974 | Shiraishi et al. | 260/680 E |
| 3,842,132 | 10/1974 | Lo et al. | 260/680 R |

*Primary Examiner*—Paul M. Coughlan, Jr.
*Attorney, Agent, or Firm*—DePaoli & O'Brien

[57] ABSTRACT

In a process for the dehydrogenation of hydrocarbons to form olefins and/or diolefins, the steps comprising contacting said hydrocarbons with a dehydrogenation catalyst in a first zone and then in a second zone with a novel reducible catalyst system comprising a vanadate and/or molybdate of Group IV-A and/or V-A metals promoted by a compound of Group V-B, VI-B or VIII of the Periodic Table of the elements.

9 Claims, No Drawings

DEHYDROGENATION OF HYDROCARBONS

BACKGROUND OF THE INVENTION

1. Field of the Invention

This invention relates to an improved process for the dehydrogenation of hydrocarbons, preferably paraffins, to form olefins and/or diolefins. More particularly, this invention concerns the use of a novel dehydrogenation-oxidation catalyst system for improving the conversion of the dehydrogenation process, and the selective recovery of olefins and/or diolefins.

2. Description of the Prior Art

In the dehydrogenation of paraffins or a mixture of paraffins and olefins to form olefins and/or diolefins, a well known process, high temperatures and vacuum operation are usually necessary or desirable in order to obtain favorable thermodynamic equilibria. Vacuum operation requires that the effluent gases from the reactor be compressed to atmospheric pressure or higher before the products are purified and recovered. Thus, the yields of olefins and/or diolefins per pass in most units are limited by the thermodynamics and also by the capacity of the compressors to compress the large amounts of hydrogen and other light hydrocarbons back to atmospheric pressure. One alternative to this practice, as disclosed in the prior art, is to use a conventional dehydrogenation catalyst in conjunction with an oxidation catalyst. See for example, U.S. Pat. No. 3,161,670 in which the oxygen is added to the system as air and U.S. Pat. No. 3,488,402 in which the oxygen is supplied by the oxidation catalyst itself. When oxygen is added to the system as air as in U.S. Pat. No. 3,161,670, the 80% nitrogen component of the air greatly increases the load on the compressor units. Moreover, the amount of oxygen gas present as oxidant must be controlled so that the hydrogen and oxygen gases do not become major components in the mixture of hydrocarbon reactants. Thus, it is preferred to store the oxygen in the catalyst as disclosed in U.S. Pat. No. 3,488,402. As the commercial dehydrogenation of paraffins or a mixture of paraffins and olefins is a cyclic process in which the conventional dehydrogenation catalyst is periodically regenerated with air, the oxidation catalyst can be reoxidized to its original state during the regeneration phase. Therefore, the process disclosed in U.S. Pat. No. 3,488,402 offers several advantages in the dehydrogenation of paraffins. However, the selectivity of the process in these prior processes prevents them from economic success.

The dehydrogenation process of the present invention involves the use of a combination of a dehydrogenation catalyst with an oxidation catalyst which is reducible to a lower valence state during the dehydrogenation of hydrocarbons and is reoxidized to its original state during the regeneration phase. In this process, air is added to the system during the regeneration phase. Thus, the present process represents an improvement over these prior art procedures, particularly in the novel catalyst system used in the process.

SUMMARY OF THE INVENTION

It is accordingly one object of the invention to provide a dehydrogenation process which overcomes or otherwise mitigates the problems of the prior art.

A further object of the invention is to provide a novel catalyst system and method for the dehydrogenation of hydrocarbons.

A still further object of the invention is to provide a novel promoted reducible catalyst for use in the dehydrogenation of hydrocarbons and especially paraffins to form olefins and/or diolefins by initial contact with a dehydrogenation catalyst followed by contact with a reducible catalyst.

Other objects and advantages of the present invention will become apparent as the description proceeds.

In satisfaction of the foregoing objects and advantages, there is provided by this invention a process for the dehydrogenation of hydrocarbons to form olefins and/or diolefins by the steps comprising contacting said hydrocarbons in a first zone with a dehydrogenation catalyst and then in a second zone with a reducible catalyst system comprising a vanadate and/or molybdate of Group IV-A and/or V-A metals promoted by a compound of Group V-B, VI-B or VIII of the Periodic Table of the elements. Also provided is a novel reducible catalyst system employed in the second zone of the system.

DESCRIPTION OF PREFERRED EMBODIMENTS

In accordance with the process of the present invention, an improved dehydrogenation process has been developed which, when operated at the same conversion levels as for example prior art, U.S. Pat. No. 3,488,402, improves the recovery and selectivity of olefins and/or diolefins.

The dehydrogenation process of the present invention involves the use of a particular catalyst system, that is a combination of a dehydrogenation catalyst with an oxidation catalyst, the latter being reducible to a lower valence state and thus selective in the conversion of olefins to diolefins. No air is added to this system since the oxidation catalyst itself serves as an oxygen source during the reduction. Since the dehydrogenation process is a cyclic process in which the conventional dehydrogenation catalyst can be periodically regenerated with air, the oxidation catalyst can be reoxidized to its original state during the regeneration phase. The use of this particular catalyst system enables the obtaining of higher yields of diolefins per pass with no increase in load on the compressors. Another feature that this system offers is that it is possible to operate conventional dehydrogenation units at higher pressure and still obtain the same amount of diolefins in the effluent gas. Since vacuum operation is expensive, the present process advantageously either reduces the size of the compressor needed or greatly increases the capacity of the existing compressors. Moreover, by this system the selectivity to desired products is greatly increased.

In the process of the present invention, the paraffins are selectively converted to olefins and/or diolefins in good yield by a two step process using two distinct catalyst systems. In the first step, the paraffins are converted by contact with a dehydrogenation catalyst, e.g. chromia-alumina, a well-known catalyst. In the second step, the resulting product mixture is contacted with a novel promoted reducible catalyst system as more particularly described hereinafter. Use of the novel promoted reducible catalyst system has been found to result in improved selectivity to the desired products.

The starting materials or hydrocarbons which are dehydrogenated by this process may be any hyrocarbon convertible to olefins and/or diolefins but preferably comprises paraffins ranging from two to about twenty or more carbon atoms, individually or in a mixture. The process of the invention is particularly suitable for the lower paraffins, that is, the $C_2$ through $C_6$ paraffins. The paraffin can also be in admixture with other hydrocarbons. Thus, suitable feeds can range from ethane, propane, n-butane, isobutane, isopentane or other individual hydrocarbon fractions available in a petroleum refinery to mixed hydrocarbon fractions comprising 30 volume percent, preferably 50 volume percent or more paraffins. Alkylated aromatics such as alkylbenzenes which contain one or more alkyl chains of two to 20 carbon atoms are also suitable feeds. The feeds are usually nonacetylenic and often are saturated or olefinically-unsaturated hydrocarbons. Whether the primary reaction occurring is a straight dehydrogenation, as opposed to dehydrocyclization, will be dependent in large part upon the feed selected. Both dehydrogenation to create one or two double bond-containing products and dehydrocyclization may occur with some feeds.

In the first step of the reaction, this feed is contacted with a dehydrogenation catalyst. The dehydrogenation catalyst used can be any of the conventional catalysts usually employed for this reaction. Catalysts of this type include alumina, magnesia, or a combination thereof, which may be promoted up to about 40% of an oxide of a metal of Group IV-B, V-B or VI-B of the Periodic Table of the Elements as presented at pages 392-393 of the "Handbook of Chemistry and Physics," 35th edition, 1953-1954. Specific examples of such catalysts include alumina promoted with about 40% of any of chromium oxide, zirconium oxide and titanium oxide; magnesia promoted either with about 20% molybdenum oxide or about 40% zirconium oxide; magnesia-alumina promoted with about 20% vanadium oxide; and unsupported active chromium oxide. A particularly effective catalytic composition for dehydrogenating paraffin hydrocarbons is chromia-alumina.

The dehydrogenation process is conducted under an elevated temperature, for instance, about 800° to 1,250°F., preferably about 950° to 1,150°F. The pressure may vary from about 0.1 to 0.8 atmospheric pressure, preferably 0.1 to 0.5 atmospheric pressure and the contact time or liquid hourly space velocity (LHSV) which may be dependent upon the catalyst, temperature and pressure employed, will generally range from about 0.1 to 10 seconds or more, preferably about one-fifth to five LHSV based on the liquid volume of hydrocarbon per volume of catalyst per hour. The dehydrogenation cycle time may vary from about 1 to 30 minutes, preferably 5 to 20 minutes. The regeneration time which would be dependent upon the dehydrogenation time and the operation conditions may vary about 1 to 60 minutes or longer, preferably about the same length of time as the dehydrogenation. These conditions are maintained in both steps of the process.

In this initial step of the process, at least some of the paraffins are converted to olefins and diolefins and in the second step conversions and selectivities are improved and completed as explained below.

To improve the conversions and selectivities to olefins and diolefins, the process of this invention further contacts the reaction products with a second catalyst system. This second system is an oxidation catalyst which is reducible under the conditions of the reaction. The reducible or oxidation catalyst used in the method of the present invention to improve the conversion to olefins and/or diolefins includes the vanadates and molybdates of Group IV-A and V-A metals promoted by a compound of Group V-B VI-B and/or VIII of the Periodic Table of the Elements as presented at pages 392-393 of the "Handbook of Chemistry and Physics" 35th edition. Thus, the novel catalysts preferably comprise vanadates and/or molybdates of metals of Group IV-A (germanium, tin or lead) or Group V-A (antimony or bismuth), promoted a compound or element of Group V-B (vanadium, niobium or tantalum), Group VI-B (chromium, molybdenum or tungsten), or Group VIII (iron, cobalt, nickel, ruthenium, rhodium, palladium, osmium, iridium or platinum). Highly preferred catalysts within this broad grouping are bismuth vanadate and bismuth molybdate promoted by palladium, platinum and/or chromium. Catalyst mixtures may also be used.

The atomic ratio of vanadium and/or molybdenum content to the Group IV-A and/or Group V-A metal content should be in the range of 0.05 to 50, preferably 0.2 to 5. The promoter (Group V-B, and VI-B and/or Group VIII) content should be in the range of 0.02 to 50 weight percent of the base oxidation catalyst, preferably 0.1 to 20 weight percent. In all of these catalysts, the metals are in combination with oxygen, the amount of combined oxygen being dependent upon the oxidation-reduction potential of the environment during their use. The oxygen is released during dehydrogenation of the hydrocarbons and is restored during the air regeneration phase.

The oxidation catalyst is prepared by reacting a Group IV-A or Group V-A metal salt, e.g. the nitrate, in an aqueous mineral acid solution and contacting with the requisite amount of promotor and vanadate or molybdate at 150°-200°F. In a highly preferred procedure, the Group IV-A or Group V-A metal salt is dissolved in a strong mineral acid solution and then added slowly to an agitated suspension of the promotor compound and oxide of vanadium or molybdenum at 150°-200°F. Thereafter, the mixture is neutralized to a pH of about 7.0 to 8.0, preferably 7.5, by addition of a base such as aqueous ammonia. The slurry is then filtered, washed and dried. The recovered dried catalyst is then pelleted to the desired size or mesh.

In operation of the process of this invention, the feed is contacted with the dehydrogenation catalyst and oxidation catalyst in distinct zones. These distinct zones or catalyst sections may be separate zones or layers in a main reactor or the oxidation catalyst can be placed in a separate reactor following the main reactor. As pointed out above, generally the same reaction conditions are maintained in both zones or reactors. In a highly preferred arrangement for the catalysts, reference is made to our copending patent application Ser. No. 349,326, filed Apr. 9, 1973, where there is described and claimed a reactor arrangement found particularly satisfactory for this reaction. The disclosure of this copending appliction is hereby incorporated by reference. The reactor system disclosed therein, a reactor is described which includes the dehydrogenation catalyst layer followed by the oxidation catalyst layer with an adsorbent layer (e.g. alumina, magnesia and/or silica gel), interposed between the oxidation layer and the next dehydrogenation layer. Therefore, it is to be understood that any desired system of dehydrogenation and oxidation catalysts may be used so long as the catalysts are kept separate.

It has been found that use of the process of the invention, and particularly the novel catalyst system, will increase selectivities by up to 20–30%, a good increase in this highly competitive industry.

The following examples are presented to illustrate the invention but is not to be considered as limited thereto. In the examples and throughout this specification, parts are by weight unless otherwise indicated.

EXAMPLE I

A bismuth vanadate catalyst containing palladium was prepared by dissolving 121 grams of bismuth nitrate in 200 ml of dilute nitric acid (20 ml of concentrated $HNO_3$ + 180 ml $H_2O$) and stirring four grams of 5% palladium on aluminum and 22.5 grams of vanadium pentaoxide in 250 ml of deionized water. The bismuth nitrate solution was added to the stirred suspension of the mixture of palladium and vanadium pentaoxide. The temperature of the suspension was maintained at about 160° to 170°F. during the addition. The mixture was neutralized to a pH of 7.5 by adding aqueous ammonia. The slurry was filtered, washed and then dried in a vacuum oven. The dried catalyst was then pelleted to one-fourth inch size. The catalyst whose atomic ratio of bismuth to vanadium is 1:1 contains 0.24% of Pd.

A palladium-free catalyst of bismuth vanadate was prepared by the same procedure to illustrate the prior art catalyst.

EXAMPLE II

Forty-two grams of palladium-free catalyst of bismuth vanadate was charged to the bottom of a reactor and 130 grams commercial butane dehydrogenation catalyst, which was a mixture of 35 grams of chromia-alumina catalyst and 95 grams of alumina inert, were charged on the top of the reactor. The reactor was used for dehydrogenation of n-butane at atmospheric pressure. The partial pressure of n-butane was reduced by dilution with four volumes of nitrogen. The liquid hourly space velocity was 0.45 (n-butane only). The process was cyclic. Results of a typical cycle at 580°C. were as follows:

TABLE I

|  | 5 min. | 10 min. | 20 min. |
|---|---|---|---|
| Conversion of n-butane mol percent | 76.87 | 72.22 | 63.65 |
| Selectivity to butadiene mol percent | 25.5 | 24.55 | 23.65 |
| Selectivity to butenes plus butadiene mol percent | 86.83 | 90.42 | 92.3 |
| Butadiene yield moles of butadiene/100 moles of n-butane | 19.6 | 17.73 | 15.01 |

EXAMPLE III

The test in this example was the same as Example II except 42 grams of bismuth vanadate catalyst containing palladium was charged to the bottom of the reactor to replace the 42 grams of palladium-free catalyst. All the test conditions were the same as those of Example II. Results of a typical cycle at 580°C. were as follows.

TABLE II

|  | 5 min. | 10 min. | 20 min. |
|---|---|---|---|
| Conversion of n-butane mol percent | 73.81 | 69.84 | 61.68 |
| Selectivity to butadiene mol percent | 31.04 | 31.84 | 30.11 |
| Selectivity to butenes and butadiene mol percent | 88.09 | 90.33 | 92.68 |
| Butadiene yield moles of butadiene/100 moles of n-butane | 22.91 | 22.24 | 18.57 |

A comparison of Examples II and III shows that the bismuth-vanadate catalyst containing palladium (Table II) has a better performance than the palladium-free bismuth vanadate catalyst.

The invention has been described herein with reference to certain preferred embodiments; however, as obvious variations will become apparent to those skilled in the art, the invention is not to be considered as limited thereto.

What is claimed:

1. A method for the dehydrogenation of hydrocarbons to form diolefins without the addition of oxygen by the steps comprising contacting said hydrocarbons with a dehydrogenation catalyst in aa first zone and then in a second zone with a reducible oxidation catalyst selected from the group consisting of bismuth vanadate and bismuth molybdate promoted by palladium, platinum and/or chromium as elements or compounds.

2. A method according to claim 1 wherein the dehydrogenation catalyst is alumina or magnesia or combination thereof, or the same catalysts promoted with up to 40% by weight of an oxide of Groups IV-B, V-B or VI-B of the Periodic Table.

3. A method according to claim 1 wherein the oxidation catalyst is promoted by a quantity of promoter in the range of about 0.02 to about 50 weight percent of the basic oxidation catalyst.

4. A method according to claim 1 wherein the hydrocarbons are paraffins and/or olefins.

5. A method according to claim 1 wherein the dehydrogenation reaction is conducted at a temperature of about 800–1250°F., and a pressure of from 0.1 up to 0.8 atmosphere.

6. A method according to claim 1 wherein contact of the hydrocarbons with the catalyst ranges from 0.1 to 10 seconds.

7. A method according to claim 1 wherein the dehydrogenation catalyst is incorporated in a lead reactor and the oxidation catalyst is incorporated in a trailing reactor.

8. A method according to claim 1 wherein the dehydrogenation catalyst and the oxidation catalyst are incorporated in different layers of the same reactor.

9. A method according to claim 8 wherein the upper layer is always dehydrogenation catalyst while the lower layer is always oxidation catalyst.

* * * * *